United States Patent
Rogers et al.

(10) Patent No.: US 7,073,817 B2
(45) Date of Patent: Jul. 11, 2006

(54) AIRBAG MODULE DOOR ASSEMBLY

(75) Inventors: Dennis R. Rogers, Sanford, NC (US); Gary A. Card, Clinton Township, MI (US); Jonathan McDonnell, Berkley, MI (US)

(73) Assignee: TK Holdings, Inc., Greensboro, NC (US)

( * ) Notice: Subject to any disclaimer, the term of this patent is extended or adjusted under 35 U.S.C. 154(b) by 0 days.

(21) Appl. No.: 10/403,662

(22) Filed: Mar. 31, 2003

(65) Prior Publication Data

US 2004/0188986 A1   Sep. 30, 2004

(51) Int. Cl.
*B60R 21/20* (2006.01)

(52) U.S. Cl. ............... 280/728.2; 280/728.3; 280/732

(58) Field of Classification Search ........... 280/728.3, 280/732, 728.2, 731, 730.1
See application file for complete search history.

(56) References Cited

U.S. PATENT DOCUMENTS

| | | | |
|---|---|---|---|
| 4,106,887 A | 8/1978 | Yasuike et al. | 425/549 |
| 4,740,150 A | 4/1988 | Sayer | 425/542 |
| 4,905,901 A | 3/1990 | Johnson | 239/135 |
| 5,135,252 A | 8/1992 | Suran et al. | 280/732 |
| 5,164,200 A | 11/1992 | Johnson | 425/130 |
| 5,204,051 A | 4/1993 | Jaroschek | 264/572 |
| 5,217,253 A * | 6/1993 | Pray | 280/732 |
| 5,230,530 A | 7/1993 | Iriyama et al. | 280/732 |
| 5,234,227 A | 8/1993 | Webber | 280/728 |
| 5,259,642 A | 11/1993 | Muller et al. | 280/732 |
| 5,348,339 A | 9/1994 | Turner | 280/728.3 |
| 5,356,174 A | 10/1994 | Rhein et al. | 280/728 |
| 5,370,416 A | 12/1994 | Hamada | 280/728 |
| 5,378,138 A | 1/1995 | Onuma et al. | 425/549 |
| 5,419,583 A | 5/1995 | Sakakida et al. | 280/728.2 |
| 5,431,432 A | 7/1995 | Webber et al. | 280/728.2 |
| 5,433,471 A | 7/1995 | Shepherd et al. | 280/728.2 |
| 5,439,246 A * | 8/1995 | Ravenberg et al. | 280/728.3 |
| 5,489,116 A | 2/1996 | Boag | 280/728.2 |
| 5,527,063 A | 6/1996 | Garner et al. | 280/728.2 |
| 5,560,644 A | 10/1996 | Fiore | 280/728.2 |
| 5,564,732 A * | 10/1996 | Bauer et al. | 280/728.3 |
| 5,613,699 A | 3/1997 | Schambre | 280/728.2 |
| 5,639,112 A | 6/1997 | Phillion et al. | 280/728.2 |
| 5,662,350 A | 9/1997 | Bathon et al. | 280/728.2 |
| 5,798,130 A | 8/1998 | VonHoldt | 425/549 |
| 5,803,487 A | 9/1998 | Kikuchi et al. | 280/728.2 |
| 5,876,058 A | 3/1999 | Nemoto | 280/728.2 |

(Continued)

FOREIGN PATENT DOCUMENTS

JP   2001171455 A   *   6/2001

*Primary Examiner*—Ruth Ilan
(74) *Attorney, Agent, or Firm*—Foley & Lardner LLP

(57) ABSTRACT

An airbag module assembly 10 comprises a module housing 12 closed by an airbag module door assembly 15. A panel 16 forms an airbag module door 16' for release of an airbag 14 upon activation of the airbag module assembly 10. Attachment members 28, 30 are connected to opposing peripheral edges 20 and 22 of the panel 16. In another aspect, a tear seam 46 may be incorporated on an attachment member 30 adjacent the peripheral edge 22 of the door 16', rather than on the panel 16. In yet another aspect, slots 48 within the attachment member 30 with upwardly angled surfaces 48.1 adjacent the edge 22 interface with corresponding arms 50 protruding from the edge 52 of the instrument panel 18, which provides enhanced leverage for a smooth tear along the attachment member 30 and a smooth deployment of the airbag 14.

11 Claims, 3 Drawing Sheets

U.S. PATENT DOCUMENTS

| | | | |
|---|---|---|---|
| 5,979,929 A | 11/1999 | Strager et al. | 280/728.2 |
| 6,039,341 A | 3/2000 | Doxey et al. | 280/728.2 |
| 6,042,140 A | 3/2000 | Blazaitis et al. | 280/728.3 |
| 6,159,000 A | 12/2000 | Puri et al. | 425/562 |
| 6,161,865 A | 12/2000 | Rose et al. | 280/728.3 |
| 6,179,604 B1 | 1/2001 | Takeda | 425/547 |
| 6,250,669 B1 | 6/2001 | Ohmiya | 280/732 |
| 6,296,802 B1 | 10/2001 | Blazaitis et al. | 264/328.1 |
| 6,328,554 B1 | 12/2001 | Lausenhammer et al. | 425/564 |
| 6,338,499 B1 | 1/2002 | Ueno et al. | 280/732 |
| 6,341,796 B1 * | 1/2002 | Preisler | 280/728.3 |
| 6,398,542 B1 | 6/2002 | Romanski et al. | 425/564 |
| 6,460,874 B1 * | 10/2002 | McDonnell et al. | 280/728.3 |
| 6,902,185 B1 * | 6/2005 | North | 280/728.3 |
| 2005/0110245 A1 | 5/2005 | Hurst | 280/728.2 |

* cited by examiner

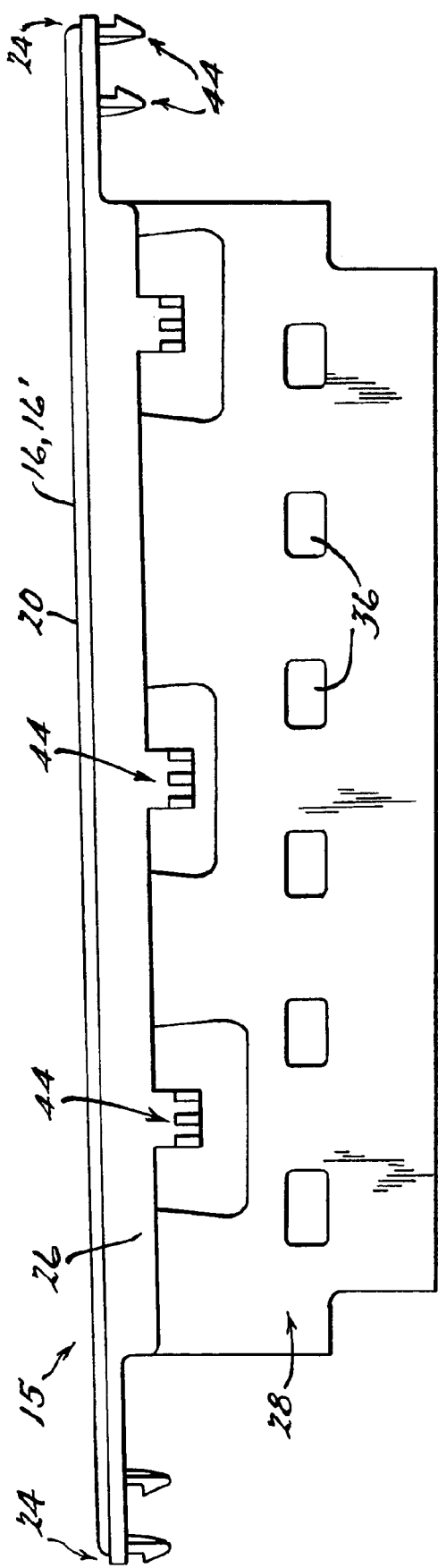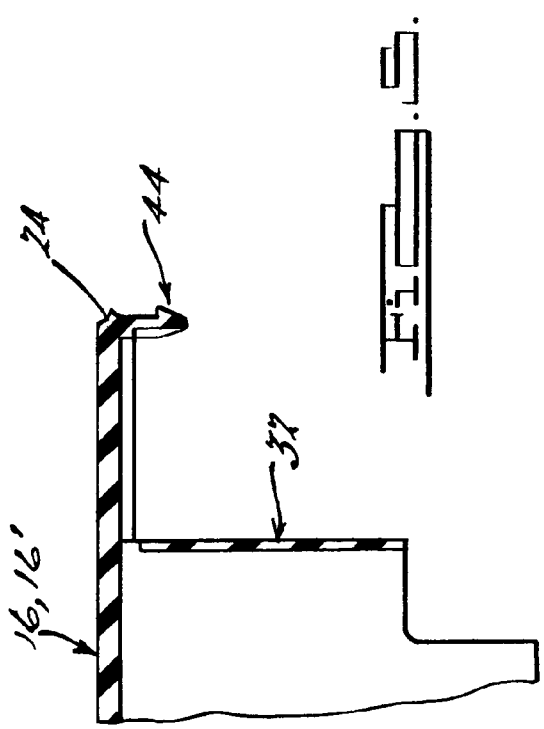

AIRBAG MODULE DOOR ASSEMBLY

FIELD OF THE INVENTION

The present invention relates generally to safety restraint systems using airbags and particularly to an airbag module door having a structure that minimizes manufacturing scores or blemishes.

BACKGROUND AND SUMMARY OF THE INVENTION

Airbag modules include airbag safety devices and are normally closed by an airbag module door or panel that gives way to airbag pressure upon activation thereof. Known airbag module covers or doors are often manufactured from thermoplastic and/or thermoset materials in known processes, rapid injection molding for example. Although many airbag doors have been designed that function as desired, the manufacturing process often results in marks, scores, or blemishes on the product thereby necessitating painting.

In general, the airbag module door includes a panel that opens upon activation of the airbag, thereby releasing the airbag for protection of the occupant. Typically, structural and/or attachment members extend from the underside of the door or panel and are therefore not visible to the occupant upon assembly within the vehicle. However, integration of the structural/attachment members on the underside of the panel often results in scores lines on the top of the panel reflecting the interface of those members on the underside of the door. Furthermore, residual gas deposition during the molding process may add further blemishes to the appearance of the unpainted door. Accordingly, the door must often be painted to improve the appearance of the finished product. As such, overall manufacturing costs are increased due to costs associated with the paint, waste paint disposal, energy required to heat and cure the paint, and the added step during the manufacturing process.

An airbag module door cover that minimizes blemishes and/or scores attendant to the manufacturing process addresses the above-referenced concerns. The door includes a panel that contains a periphery having a front edge relative to the vehicle, a rear edge closest to the occupant, and two side edges. In a preferred embodiment, a hinge member integral with the front edge extends generally orthogonal to the front edge and facilitates a swinging movement of the panel upon airbag deployment. A first attachment member extends from the hinge member and is generally coextensive therewith thereby providing a first attachment means to an associated module housing. A second attachment member opposite the first attachment member extends from the rear edge, generally orthogonal therewith, and thus provides a second attachment means to an opposite side of the associated module housing. If desired, a first support member extends from the first attachment member to the second attachment member but is not attached to the underside of the panel. Similarly, a second support member opposite the first support member also extends from the first attachment member to the second attachment member thereby providing lateral support for the attachment members without attachment to the underside of the panel. By attaching the structural/attachment members to the peripheral edges rather than the underside of the panel, manufacturing scores and blemishes are minimized, thereby obviating the need for painting of the finished part. It should be appreciated that the hinge member may be oriented on either the rear or front edge, as determined by design criteria.

Additionally and/or alternatively, the tear seam of the cover may be located on the second attachment member adjacent the rear edge of the door to eliminate the need to manufacture the seam within the panel. Oftentimes, when manufactured within the door panel, the seam is either visibly apparent, or, the presence of the tear seam is indicated by a discoloration in the finished part, for example. As such, a plurality of slots contained along the length of the second attachment member engages a corresponding plurality of arms extending from the vehicle structure or instrument panel. The arms extend inwardly into a vehicle cavity designed for placement of the airbag module. Stated another way, the vehicle cavity formed (within an instrument panel for example) for placement of the airbag module therein is roughly congruent or equal in distance along its periphery with the periphery defined by the edges of the door panel cover. When the arms are placed within the slots, the arms provide enhanced leverage as pressure develops on the underside of the door panel upon airbag activation. The tear seam is thus readily and quickly separated thereby assuring a smooth deployment of the airbag as the door swings away from the airbag trajectory.

BRIEF DESCRIPTION OF THE DRAWINGS

The present invention will be more fully understood from the detailed description and the accompanying drawings, wherein:

FIG. 4 is a front view of the airbag module door in accordance with the present invention; and FIG. 5 is a sectional side view of the airbag module door in accordance with the present invention.

DETAILED DESCRIPTION OF THE PREFERRED EMBODIMENT(S)

Figure 1:
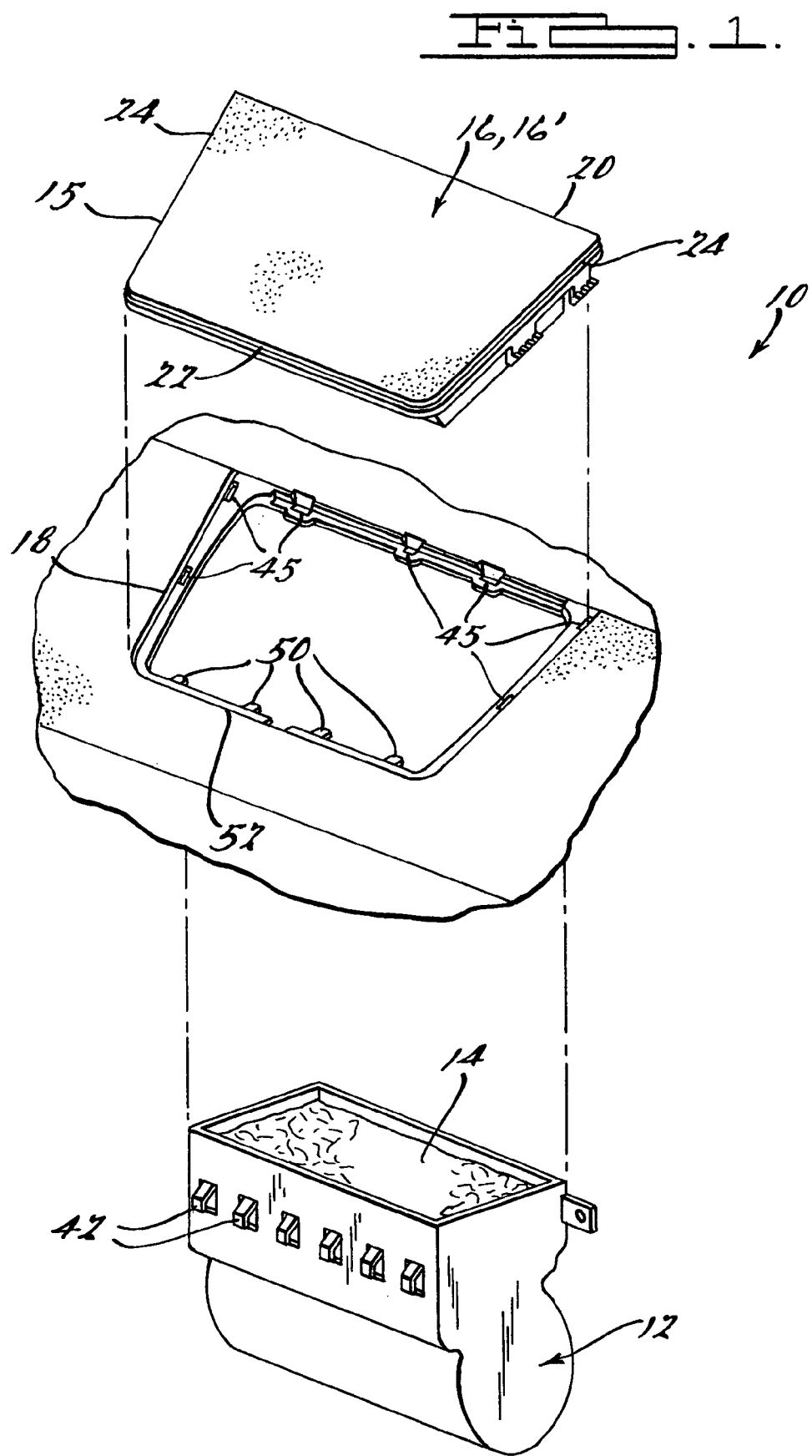
FIG. 1 is an exploded perspective view of an airbag module assembly in accordance with the present invention.
Figure 2:
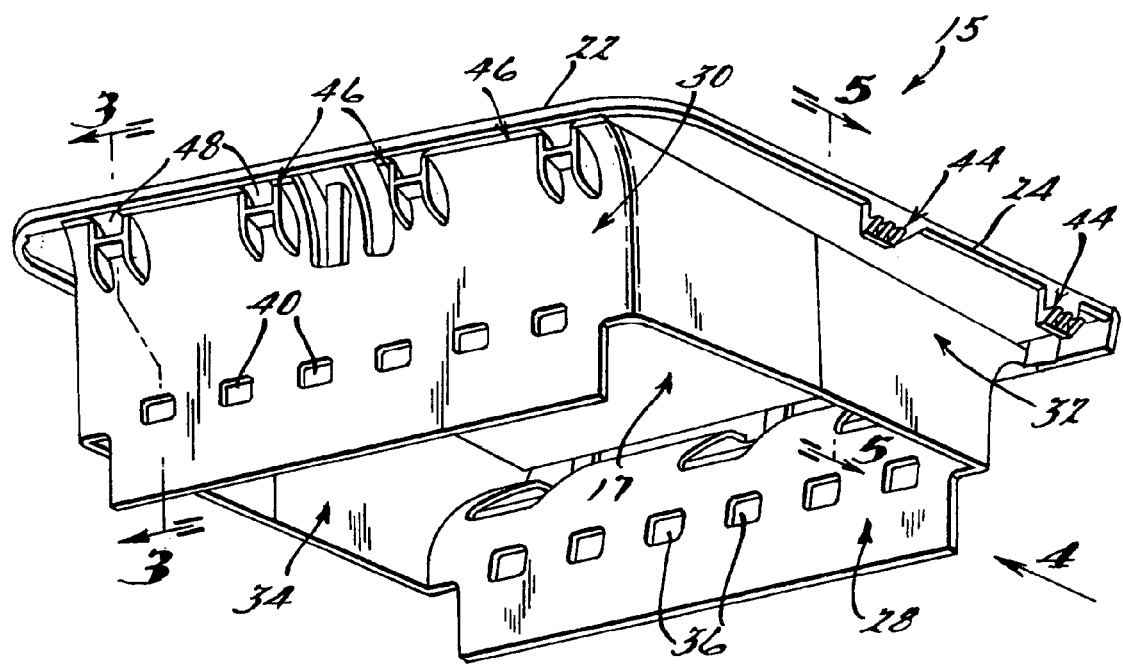
FIG. 2 is a rear perspective view of an airbag module door in accordance with the present invention.
Figure 3:
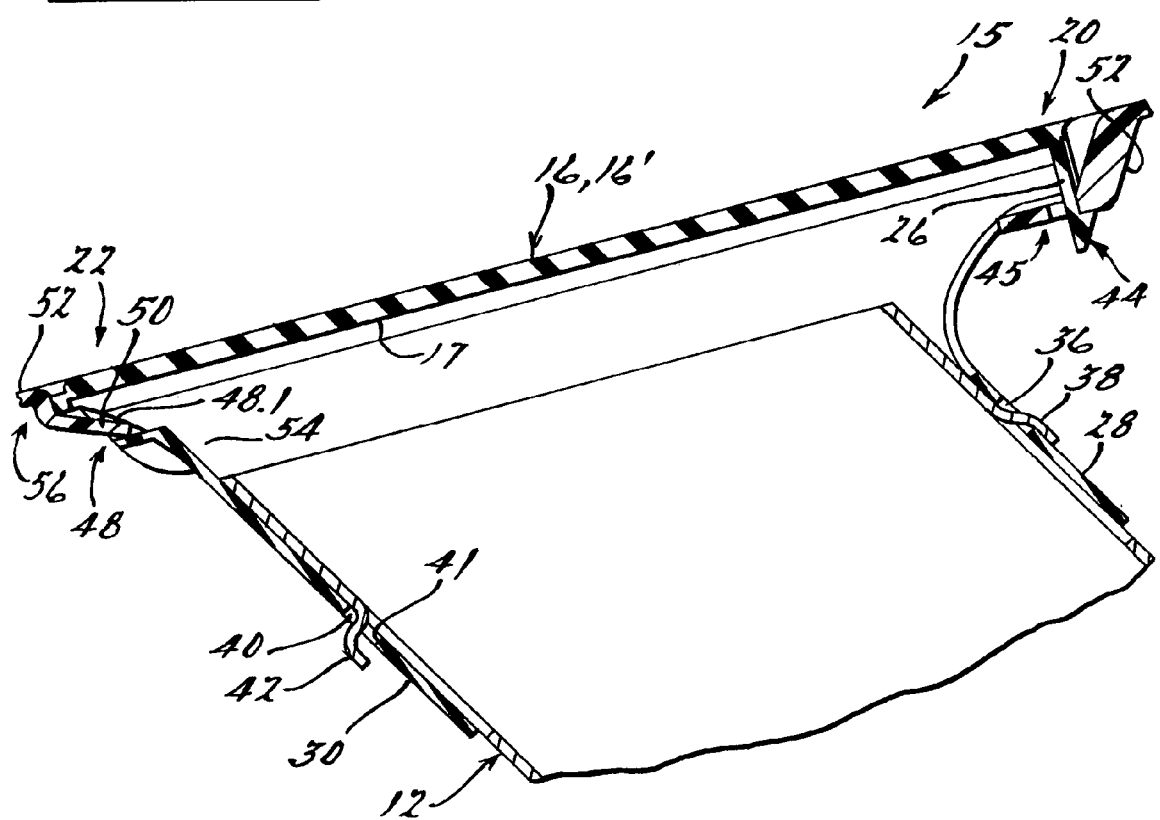
FIG. 3 is a sectional view of an airbag module door in accordance with the present invention.

Referring to FIGS. 1–3, an airbag module assembly 10 generally contains a housing 12 for containment of a gas generator (not shown) and an airbag 14, and an airbag module door assembly 15, also known as a cover 15, for closure of the housing 12. During normal vehicular activity, a panel 16 at the top of the airbag nodule door assembly 15 seals the contents of the airbag module assembly 10 and also provides aesthetic appeal relative to the vehicle interior. Oftentimes, the panel 16 of the cover 15, once assembled to the airbag module assembly 10, is integrated as part of the instrument panel 18 or other interior structure of the vehicle.

In a preferred embodiment, the panel 16 comprises a periphery having a front edge 20, a rear edge 22, and two opposing side edges 24. A hinge member 26 extends orthogonally and integrally from and along the length of the front edge 20, and provides a pivot for a door 16' of the cover 15 once the airbag 14 is activated and the door 16' is released. A first attachment member 28 extends from and is integral with the hinge member 26, and attaches the door 16' to the module housing 12 associated therewith. A second attachment member 30 opposite the first attachment member 28 extends from and is integral with the rear edge 22, and, prior to airbag deployment, also attaches the door 16' to the module housing 12 associated therewith. In general, each attachment member 28, 30 is somewhat orthogonal to the underside 17 of the panel 16. If desired, a first support member 32 integrally extends from the first attachment member 28 to the second attachment member 30 but is not otherwise attached to the panel 16. Similarly, a second support member 34 opposite the first support member 32 also integrally extends from the first attachment member 28 to the second attachment member 30 but is not otherwise attached to the panel 16. Accordingly, the first 32 and second 34 support members provide lateral support for the first 28 and second 30 attachment members and the first 28 and second 30 attachment members also provide lateral support for the associated first 32 and second 34 support members.

In a preferred embodiment, a first plurality of slots 36 extend along the length of the first attachment member 28 and interface with a corresponding first plurality of hooks 38 or appendages on the associated module housing 12. A second plurality of slots 40, opposite the first plurality of slots 36, extend along the length of the second attachment member 30 and interfaces with a corresponding second plurality of hooks 42 or appendages, also on the module housing 12. Once the first 36 and second 40 pluralities of slots are snapped in place over the corresponding first 38 and second 42 pluralities of hooks respectively, the cover 15 is snugly fixed to the module housing 12. It should be noted, however, that the first 38 and second 42 pluralities of books preferably "float" within the first 36 and second 40 pluralities of slots. Stated another way, the first 38 and second 42 pluralities of hooks are preferably biased against one or more of the inner walls 41 of the first 36 and second 40 pluralities of slots but not necessarily against all of the inner walls 41. As such, a given spatial tolerance between the first 38 and second 42 pluralities of hooks and the corresponding first 36 and second 40 pluralities of slots is provided thereby ensuring an acceptable fit within various vehicle interiors once the cover 15 is snapped in place. Once the airbag is deployed, engagement of the first 38 and second 42 pluralities of hooks with the corresponding first 36 and second 40 pluralities of slots, respectively, enhances the leverage needed to tear away the door 16'. Referring also to FIG. 5, a third plurality of hooks 44 may also be included along the periphery of the door 16' whereby one or more of the front 20 and side 24 edges has at least one hook extending therefrom. The resilient or flexible nature of the third plurality of hooks 44 facilitates a snap fit with associated slots 45 in the instrument panel 18 as the module cover 15 is seated within or mated with the instrument panel 18, or a designated part of the vehicle interior.

In yet another aspect of the invention, the second attachment member 30 preferably contains a tear seam 46 or tear portion, or a plurality thereof, adjacent the rear edge 22, thereby providing for opening the airbag door 16' from the cover 15, and releasing the airbag from the housing 12 through the open door 16' once the airbag 14 is activated and pressure bears upon the underside 17 of the door 16' causing the door 16' to pivot about the hinge member 26 on the opposite first attachment member 28. In conjunction therewith, the second attachment member 30 contains a third plurality of slots 48 extending along the length of the second attachment member 30 adjacent the rear edge 22. A corresponding plurality of arms 50, or appendages, extend from an instrument panel edge 52 proximate to the rear edge 22 of the cover 15. Upon assembly, each of the plurality of arms 50 is lodged within a corresponding slot within the third plurality of slots 48, thereby further fixing the cover 15 over the housing 12 and also mitigating any vibrational noise or rattling during vehicular movement.

It should be noted that other embodiments may incorporate other known instrument panel fasteners, including clips, in accordance with the present invention. Fasteners, then, could be employed with an embodiment having the attachment members 28, 30 extending from the edges 20, 22 of the cover 15 as described above. Alternatively, and by way of example, the panel 16 may in fact have a tear seam extending across its middle, in a manner known in the art. The median tear seam, then, could also be employed with an embodiment having the attachment members 28, 30 extending from the edges 20, 22 of the cover 15 as described above. In essence, these embodiments and others, painted or unpainted, all feature a reduction in manufacturing blemishes, and therefore improve the overall appearance in accordance with the present invention.

Referring to FIG. 3, the depth of the third plurality of slots 48 preferably exceeds that of the first 36 and second 40 plurality of slots. Furthermore, it should be emphasized that the top surface 48.1 of each of the third plurality of slots 48 is preferably angled upwardly and outwardly. Stated another way, the top surfaces 48.1 of each of the third plurality of slots 48 are angled upwardly from an inside portion 54 of the second attachment member 30 toward an outside portion 56 thereof. Accordingly, the interface between the plurality of arms 50 and the third plurality of slots 48 results in an interference fit thereby, creating leverage once airbag pressure is applied to the underside 17 of the panel 16. As the pressure increases, the added leverage facilitates a more rapid tear along the tear seam 46 thereby providing a smoother release of the door 16' and the associated airbag 14. Because the tear seam 46 is incorporated along the upper edge of the second attachment member 30, no tear seam is visible from the visible or upper side of the panel 16. It should be noted, however, that if desired, the tear seam might still be incorporated within the panel 16 by methods known in the art.

In accordance with one aspect, a cover 15 comprises a panel 16 and at least one attachment member 28, 30 extending from a peripheral edge 20, 22 thereof. In accordance with another aspect, a cover 15 comprises a door 16' incorporating a tear seam 46 on an attachment member 30, wherein the tear seam 46 is readily torn responsive to airbag deployment by virtue of the leverage provided by the action of the plurality of arms 50 in cooperation with the angled third plurality of slots 48 associated with the same attachment member 30. These aspects—i.e. incorporating attachment members 28, 30 along the peripheral edges 20, 22 of the panel 16, or incorporating a tear seam 46 readily torn by enhanced leverage of the plurality of arms 50 acting in cooperation with the third plurality of slots 48, alone or in combination, provides for a reduction in associated manufacturing blemishes. Either or both aspects may be incorporated within the door 16' as per design criteria.

A cover 15 in accordance with the present invention is preferably made from thermoplastic materials in a rapid injection molding (RIM) process. Known process parameters and the details thereof will be appreciated by those of ordinary skill. Thermoplastic olefins, polyethylene, polypropylene, and other thermoplastics are preferred. However, other suitable materials such as thermoset plastics, and other known processes, may also be employed. U.S. Pat. Nos. 6,296,802, 6,042,140, 6,179,604, 6,328,554, 6,159,000, and 5,378,138, each incorporated herein by reference, exemplify known processes and equipment.

It should be noted that extending the attachment members 28, 30 from the front 20 and rear 22 edges of the panel 16 also provides for associated process advantages. Optimizing the appearance of the finished product can be enhanced by first gating the molten plastic into the integral attachment members 28, 30 prior to plastic deposition within the panel area of the mold. Accordingly, the gas residue normally attendant in the RIM process is plated out on the attachment members 28, 30 and support members 32, 34, or, on areas not otherwise viewed by the occupant. As will be appreciated by one of ordinary skill in the art, gas residue may be further eliminated by providing cold wells within the mold tunnel thereby plating out gas residue prior to release from the gate. By eliminating the gas residue in the molten plastic prior to deposition of the plastic within the panel portion of the part cavity within the mold, the appearance of the part can be markedly enhanced.

The structure of the present door 16' inherently offers several advantages. Because manufacturing blemishes are substantially eliminated from the face of the panel 16 visible to vehicle occupants, the panel 16 need not be painted prior to assembly. Rather, the panel 16 may be molded in a color designed for the interior of the respective vehicle, ready for assembly. As a result, manufacturing is simplified given the absence of the painting step. Furthermore, costs associated with painting including the costs of paint, of paint waste disposal, and of heat and energy costs associated with curing the paint are virtually eliminated. From an environmental standpoint, the aggregate reduction in paint waste solids results in a product much more responsive to the constant drive to improve the environment. Accordingly, depending on design criteria, the panel 16 may or may not be painted upon removal from the mold.

While specific embodiments of the instant invention have been described in detail, those with ordinary skill in the art will appreciate that various modifications and alternatives to those details could be developed in light of the overall teachings of this disclosure. Accordingly, the particular arrangements disclosed are meant to be illustrative only and not limiting as to the scope of the invention, which is to be given the full breadth of the appended claims and any and all equivalents thereof.

The invention claimed is:

1. An airbag module door assembly connectable to an airbag module housing, said airbag module door assembly comprising:
    a panel forming an airbag module door, said panel having a peripheral edge;
    a first attachment member integral with and extending from said peripheral edge, said first attachment member connecting said airbag module door to said airbag module housing;
    a hinge member connecting said panel to said first attachment member for pivoting said panel upon activation of said airbag module door;
    a second attachment member opposite to said first attachment member, said second attachment member integral with and extending from said peripheral edge, said second attachment member connecting said airbag module door to said airbag module housing;
    a first support member extending from said first attachment member to said second attachment member and integral with both said first and second attachment members; and
    a second support member opposite said first support member, said second support member extending from said first attachment member to said second attachment member,
    wherein neither said first support member nor said second support member is otherwise attached to said panel.

2. An airbag module door assembly adapted to connect to an airbag module housing as recited in claim 1, wherein said first attachment member comprises at least one first slot adapted to cooperate with at least one first hook of said airbag module housing, so as to provide for attaching said airbag module door assembly to said airbag module housing.

3. An airbag module door assembly adapted to connect to an airbag module housing as recited in claim 2, wherein said at least one first slot is adapted to provide for said air bag module door assembly to float with respect to said airbag module housing when said airbag module door assembly is attached to said airbag module housing.

4. An airbag module door assembly adapted to connect to an airbag module housing as recited in claim 1, wherein said first attachment member comprises a plurality of first slots adapted to cooperate with a corresponding plurality of first hooks of said airbag module housing, so as to provide for attaching said airbag module door assembly to said airbag module housing.

5. An airbag module door assembly adapted to connect to an airbag module housing as recited in claim 4, further comprising at least one second hook operatively coupled to said peripheral edge, wherein said at least one second hook is adapted to cooperate with a corresponding at least one second slot in an instrument panel of a vehicle, so as to provide for locating said airbag module door assembly relative to said instrument panel.

6. An airbag module door assembly adapted to connect to an airbag module housing as recited in claim 1, further comprising at least one tear seam incorporated in said second attachment member, wherein said at least one tear seam is proximate to said at least one peripheral edge associated with said at least one attachment member.

7. An airbag module door assembly adapted to connect to an airbag module housing as recited in claim 1, wherein said hinge provides for hinging said door from said first attachment member.

8. An airbag module door assembly connectable to an airbag module housing, both seatable within a predetermined cavity in a vehicle, said airbag module door assembly comprising:
    a panel forming an airbag module door, said panel having first periphery comprising a first edge and an opposite second edge;
    an attachment member integral with and extending from said second edge, said attachment member connecting said airbag module door to said airbag module housing;
    a tear seam integral with said attachment member and extending adjacent to said second edge;
    a plurality of slots extending along a length of said attachment member adjacent said tear seam, at least one surface of said plurality of slots angled upwardly;
    a second periphery defining a vehicle cavity for insertion of said airbag module housing, said vehicle cavity having a third edge; and
    a plurality of arms extending from said third edge, inwardly within said cavity, each of said arms corresponding to one of said plurality of slots,
    wherein upon assembly of said airbag module door assembly, each of said arms of said third edge are lodged within a corresponding slot within said plurality of slots.

9. An airbag module door assembly connectable to an airbag module housing, both seatable within a predetermined cavity in a vehicle, said airbag module door assembly comprising:

a panel forming an airbag module door, said panel having a first periphery comprising a first edge and an opposite second edge;

an attachment member integral with and extending from said panel, said attachment member connecting said airbag module door to said airbag module housing;

a tear seam integral with said attachment member and extending adjacent to said second edge;

a plurality of slots extending along a length of said attachment member adjacent said tear seam, said plurality of slots angled upwardly and converging toward said second edge;

a second periphery defining a vehicle cavity for insertion of said airbag module housing, said vehicle cavity having a third edge; and a plurality of arms extending from said third edge, inwardly within said cavity, each of said arms corresponding to one of said plurality of slots, wherein upon assembly of said airbag module door assembly, each of said arms of said third edge are lodged within a corresponding slot within said plurality of slots.

10. An airbag module door assembly adapted to connect to an airbag module housing, comprising:

a. an airbag module door comprising a panel, said panel comprising a plurality of peripheral edges;

b. at least one attachment member integral with and extending from at least one said peripheral edge, wherein said at least one attachment member is adapted to attach said airbag module door assembly to said airbag module housing;

c. at least one tear seam incorporated in said at least one attachment member, wherein said at least one tear seam is proximate to said at least one peripheral edge associated with said at least one attachment member;

d. at least one slot in said at least one attachment member, wherein said at least one slot in said at least one attachment member is adapted to engage with a corresponding at least one arm of an instrument panel, said at least one slot is adapted so that upon engagement with said at least one arm of said instrument panel, said at least one arm restrains said at least one attachment member so as to provide for a fracture of said tear seam responsive to a deployment of an airbag in said airbag module housing;

wherein said at least one slot comprises a sloped surface adapted to create an interference fit with said at least one arm of said instrument panel.

11. An airbag module door assembly adapted to connect to an airbag module housing as recited in claim 10, wherein said at least one attachment member comprises first and second attachment members, said first and second attachment members extend from corresponding first and second peripheral edges of said panel, and first and second peripheral edges are opposite to one another, further comprising at least one hinge operative between said panel and a corresponding at least one said attachment member, wherein said hinge provides for hinging said door from said corresponding at least one said attachment member, said at least one hinge is operative between said panel and said at least one said attachment member, and said at least one slot in said at least one attachment member is in said second attachment member.

* * * * *